April 27, 1954   E. W. CARR ET AL   2,676,607
FROSTPROOF HYDRANT
Filed Aug. 16, 1950
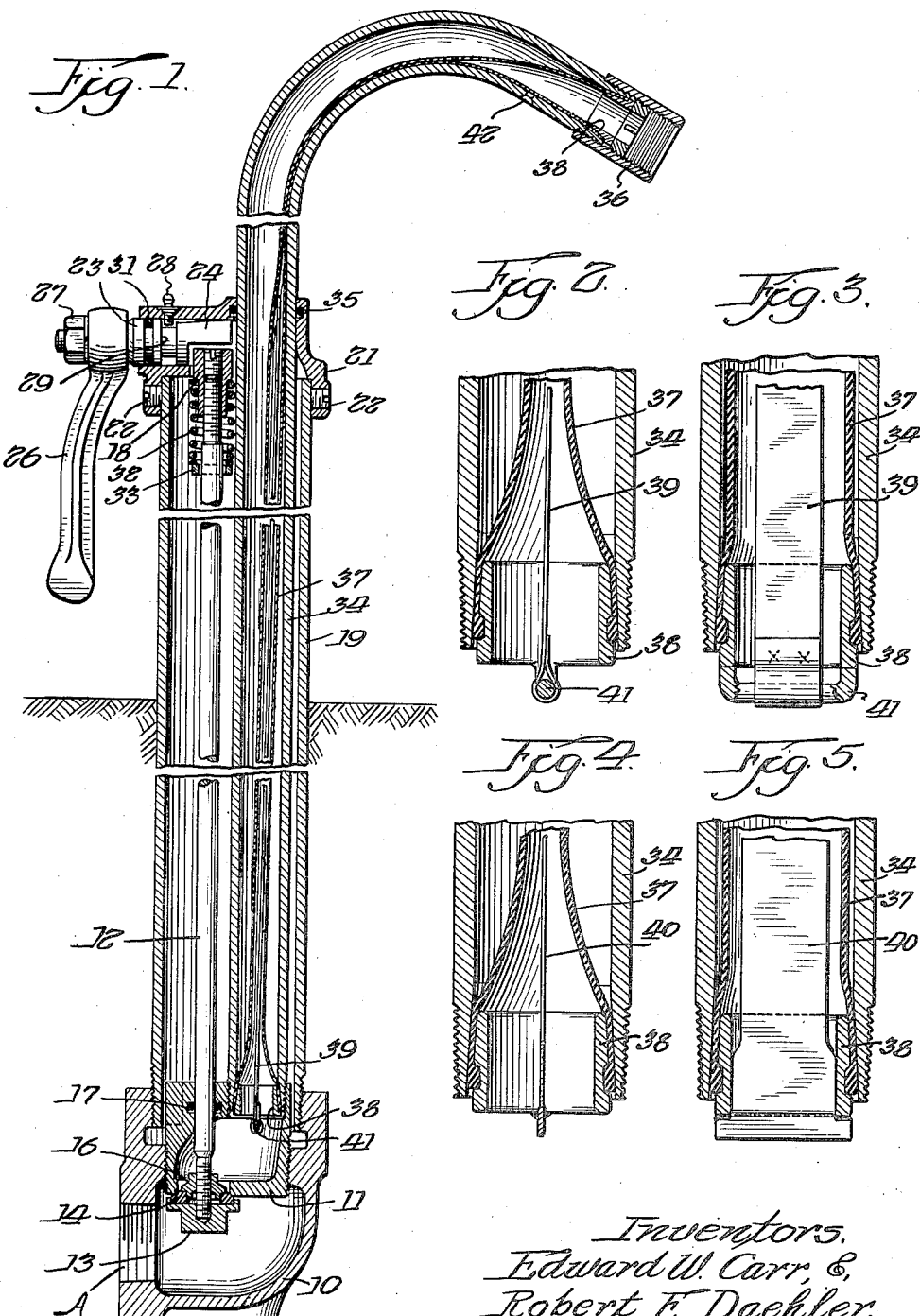
Inventors.
Edward W. Carr, &
Robert F. Daehler.
By Joseph O. Lange Atty.

Patented Apr. 27, 1954

2,676,607

UNITED STATES PATENT OFFICE 2,676,607

FROSTPROOF HYDRANT

Edward W. Carr and Robert F. Daehler, Chicago, Ill., assignors to Crane Co., Chicago, Ill., a corporation of Illinois Application August 16, 1950, Serial No. 179,832

13 Claims. (Cl. 137—301)

1

This invention pertains to improvements in hydrants. More particularly, this invention is a frostproof hydrant which preferably employs a lining of rubber or the like for the purpose of avoiding the dangers of freezing normally incident to hydrants in general.

At the outset, it should be understood that heretofore even the rubber lined frostproof hydrants have not operated satisfactorily under certain conditions, because it has been found that frequently operation of the hydrant permits of the freezing of the water which remains within the rubber lining after contraction thereof. Thus, ice is formed in a central column within the lining, and while theoretically, this cloumn of ice will not interfere substantially with subsequent water flow through the lining which, of course, expands under flow pressure, it has been apparent, however, from actual operating conditions that the ice column breaks up upon subsequent flow through the lining, and the ice therein forms a blockade which impedes flow. It is with the remedy of this undesirable feature of hydrant operation that this invention is primarily concrened.

Therefore, it is an important object of this invention to provide an improvement in hydrant structure which will inhibit the breaking up of the ice column referred to which is formed within the lining of the hydrant.

Another object is to provide a hydrant structure which will partially relieve the lining of a hydrant spout from excessive destructible forces, such as the impact force of initial flow.

Other objects and advantages will become more readily apparent upon reading the following description in light of the accompanying drawings, in which Fig. 1 is a sectional view of a hydrant embodying a preferred form of this invention.

Fig. 2 is an enlarged view of a portion of Fig. 1.

Fig. 3 is a side view of the structure referred to in Fig. 2.

Fig. 4 is a modification of the structure shown in Fig. 2.

Fig. 5 is a side view of the structure shown in Fig. 4.

Similar reference numerals refer to similar parts throughout the several views.

As shown in Fig. 1, this invention applies generally to a water hydrant or the like comprising a conventional standpipe housing 10 having the usual water inlet and outlet openings therein. The housing inlet A is shown threaded to connect directly to a water supply line (not shown). The

2 outlet opening is positioned in an upper portion of the housing 10 and is suitably threaded to receive a valve body 11, as indicated. Connected to a stem 12 to selectively interrupt water flow through the valve opening in the valve body 11 is the reciprocably movable disc holder 13 carrying a disc 14. A disc nut 16 is provided to secure the disc assembly which is threaded into the lower end of the stem 12. The stem 12 extends upward through the valve body 11 where the stem is sealed in fluid tight relation therewith by an O-ring 17. The upper end of the stem 12 is preferably threaded into a spring nut 18 and is actuated by a means hereinafter described.

Of such length as may be required, a standpipe 19 is threaded into the upper portion of the housing 10, thereby to enclose the upper portion of the valve body 11 and also the stem 12 and to extend upward to approximately the top of the stem. A cap 21 is mounted over the upper end of the standpipe 19 and a plurality of set screws 22 serve to connect these two members, as illustrated. Transversely extending through the side of cap 21 a cam shaft 23 is mounted, serving as a valve actuating means. It is provided with a cam 24 which contacts the top surface of the spring nut 18 and creates a force downwardly on the nut upon suitable rotation of the cam shaft 23. A handle 26 for gripping by the operator is attached by means of the nut 27 to the outer end of the shaft 23, thus to provide for manual operation thereof. To secure the cam shaft 23 to the cap 21, a pin 28 projects through the cap to be received at an inner end within a circular groove 29 in the shaft. An O-ring 31 for sealing purposes may be provided as shown to insure fluid tightness between the cap and the shaft.

It should be apparent that rotation of the handle 26 will move the cam 24 to contact the spring nut 18 and in so doing displace the spring nut 18 downwardly. Thus, the hydrant valve is selectively opened. A coil spring 32, disposed between the nut 18 and a stationary saddle 33 mounted on the standpipe to give upward support to the spring, provides for the resilient carrying of the stem 12, and thereby automatically maintains the valve tightly seated when the handle is turned, and the cam is returned to its original position as illustrated.

Threadedly mounted in an upper opening in the valve body 11, the spout 34 is provided which extends upwardly within the standpipe 19 to project through the cap 21. A seal ring 35 may be provided to insure fluid tightness between the spout and cap. The upper portion of the spout 34 is curved downwardly, and the end thereof is fitted with a water outlet coupling 36 suitable for connecting to a hose or the like (not shown).

Disposed within the spout 34 is a separate tubular lining 37, preferably of rubber or like material, which lining is attached to the spout ends by means of the ferrules 38 wedged within the spout 34 to clamp the tube 37 relatively taut therebetween. As will be apparent from the arrangement shown in Fig. 1, the tube 37 is stretched within the spout 34 to assume the normal shape shown therein. When the hydrant valve is open, water passes into the valve body 11 from where it enters the tube 37 to expand the same and flow therethrough. When the valve is closed, water remaining within the tube 37 is substantially squeezed therefrom by contraction of the tube to the normal relatively flattened shape shown in Fig. 1. A vent hole 42 may be provided as shown in the spout 34 to facilitate breathing through the chamber between the tube and spout. It will be apparent that the water then existing within the tube 37 may freeze into a column of ice, and it is the handling of the aforesaid column of ice with which this invention is concerned and as hereinafter described.

As more clearly shown in Figs. 2 and 3, the elongated insert member 39 is connected to a cross member termed an anchor bar 41 which is attached to the ferrule 38 with the said insert member extending upward substantially along the central portion of the tube 37 to a point preferably short of the spout curve, as shown. Thus, it has been discovered that the insert 39 provides a nucleus or core for the formation and retention of the column of ice previously referred to, thereby inhibiting the objectionable breaking up of ice which usually blocks water passage through the tube. The ice then remains columnar in form about the insert 39 in the center of the tube 37 wherefrom the flow of water washes the ice away.

As better shown in Figs. 2 and 3, the preferred shape of the insert 39 is relatively flat having a width of approximately one-third the ferrule diameter. These dimensions have been found to give the greatest flow area through the tube 37 with a correspondingly efficient insert surface to act as a nucleus for the ice formation. It has also been found that the insert surface should preferably be roughened or uneven to provide a better grip and support for the column of ice formed therearound.

It should, of course, be realized that other means may be employed to connect the insert 39 within the tube 37, and other shapes of inserts may be used. In the latter connection, the foregoing modifications may assume the form and characteristics shown in Figs. 4 and 5, for example, wherein an insert 40 is of a width substantially the diameter of the ferrule 38, and is attached by having shoulders abut the ferrule 28, as illustrated.

Still a further important structural modification will be apparent which should be expressly noted. Specifically, the insert 39 may extend to any point within tube 37, and, more particularly, the insert could connect at both ends of the spout 34. Also, the spout 34 could be eliminated and the tube 37 made self-supporting or attached by other conventional means (not shown). However, as determined by the actual test results, the structural form shown in Figs. 1 to 3, inclusive, is the preferred form.

Although this invention has been described in specific forms, it is clear that it is susceptible to numerous changes, and should, therefore, be limited only by the spirit thereof and the scope of the appended claims.

We claim:

1. In a means for preventing the formation of ice to clog passages in substantially elongated conduit, the combination comprising an outer conduit, an inner collapsible conduit positioned within the outer conduit, the fluid flow path being through said collapsible conduit, and elongated flat strip-like insert means axially extending within the inner conduit, the said latter insert means being attached at least to one of said conduits to hold it against axial movement.

2. Means for inhibiting the breaking up and jamming of ice within a passage, said means comprising a conduit having the characteristic of a normally substantially collapsed cross-section capable of transverse expansion, an elongated flat strip-like member axially disposed within at least a portion of said conduit to provide a core for the support of an ice formation within said conduit.

3. A frostproof hydrant comprising in combination an outer cylindrical member, an elastic expandible inner liquid conducting tube disposed within said outer cylindrical member and cooperating therewith to receive the liquid flow, and an elongated flat strip member axially extending and radially spaced within said liquid conducting tube and connected at the inlet end thereof.

4. A frostproof hydrant comprising in combination a standpipe housing having inlet and outlet openings therethrough and a valve seat therein, a valve member, a stem connected to said valve member to locate the same adjacent said valve seat, means for actuating said stem, a spout connected to said standpipe housing, a transversely expansible tubular lining radially disposed within said spout, and an insert member of flat strip form axially spaced within said tubular lining.

5. A discharge outlet means for inhibiting the formation of ice within a passage comprising in combination a tubular liquid conducting member normally collapsed upon cessation of flow therethrough, a longitudinally extending flat strip insert element substantially radially spaced within at least a portion of said tubular member.

6. A liquid discharge outlet means for inhibiting the jamming of ice within a passage comprising in combination a self-collapsible liquid conducting tube, a longitudinally fixed and elongated flat strip element disposed substantially parallel to the axis of said collapsible tube and being substantially spaced at least in part from an inner wall of said tube.

7. A discharge outlet means for inhibiting the formation of ice within a passage, comprising in combination a tubular liquid conducting member normally collapsed upon cessation of flow therethrough, a longitudinally extending flat metallic strip radially spaced therefrom within at least a portion of said tubular member.

8. A discharge outlet means for inhibiting the formation of ice within a passage, comprising in combination a tubular liquid conducting member normally collapsed upon cessation of flow therethrough, a longitudinally extending flat metallic strip having roughened surfaces and being radially spaced within at least a portion of said tubular member.

9. A discharge outlet means for inhibiting the formation of ice within a passage, comprising in combination a tubular liquid conducting member normally collapsed upon cessation of flow therethrough, a longitudinally extending flat plate of relatively small cross-section and substantially radially spaced within at least a portion of said tubular member and attached at the inlet end of the latter.

10. A discharge outlet means for inhibiting the formation of ice within a passage, comprising in combination a tubular liquid conducting member normally collapsed upon cessation of flow therethrough, a longitudinally extending flat wire substantially radially spaced within at least a portion of said tubular member and attached at one end of the latter.

11. A discharge outlet means for inhibiting the formation of ice within a passage, comprising in combination a tubular liquid conducting member normally collapsed upon cessation of flow therethrough, a longitudinally extending strip having an irregular surface and being substantially radially spaced within at least a portion of said tubular member.

12. A frostproof hydrant comprising in combination a tubular spout member, an elastic tubular liner stretched within said curved spout and attached at the ends thereof, an elongated strip disposed within at least a portion of said liner to extend between the inlet end and the outlet portion of the said spout member.

13. A frostproof hydrant comprising in combination a discharge passage, a liquid conducting elastic tubular member stretched within said discharge passage and attached at the ends thereof, an elongated strip disposed within the said tubular member and connected at least at the ends thereof to inhibit axial movement of the said strip member.

References Cited in the file of this patent

UNITED STATES PATENTS

| Number | Name | Date |
|---|---|---|
| 21,858 | Swan | Oct. 19, 1858 |
| 1,126,673 | Johnson | Jan. 26, 1915 |
| 2,097,733 | Miller | Nov. 2, 1937 |
| 2,277,864 | Hervath | Mar. 31, 1942 |
| 2,434,835 | Colley | Jan. 20, 1948 |

FOREIGN PATENTS

| Number | Country | Date |
|---|---|---|
| 662,351 | France | Mar. 19, 1929 |